(12) United States Patent
Ajiki et al.

(10) Patent No.: US 8,078,037 B2
(45) Date of Patent: Dec. 13, 2011

(54) INFORMATION REPRODUCING APPARATUS AND METHOD, AND COMPUTER PROGRAM

(75) Inventors: Sumie Ajiki, Saitama (JP); Kazuo Ishikawa, Saitama (JP); Tetsuya Onishi, Saitama (JP); Toru Ebata, Saitama (JP)

(73) Assignee: Pioneer Corporation, Tokyo (JP)

( * ) Notice: Subject to any disclaimer, the term of this patent is extended or adjusted under 35 U.S.C. 154(b) by 653 days.

(21) Appl. No.: 12/294,508

(22) PCT Filed: Mar. 14, 2007

(86) PCT No.: PCT/JP2007/055078
§ 371 (c)(1),
(2), (4) Date: Nov. 21, 2008

(87) PCT Pub. No.: WO2007/111133
PCT Pub. Date: Oct. 4, 2007

(65) Prior Publication Data
US 2010/0239232 A1 Sep. 23, 2010

(30) Foreign Application Priority Data
Mar. 27, 2006 (JP) .................. 2006-086167

(51) Int. Cl.
*H04N 5/93* (2006.01)
(52) U.S. Cl. .................. 386/285; 386/338

(58) Field of Classification Search .......... 386/200, 386/285, 338
See application file for complete search history.

(56) References Cited

FOREIGN PATENT DOCUMENTS

| JP | 7-182777 | 7/1995 |
|----|----------|--------|
| JP | 2001-175253 | 6/2001 |
| JP | 2002-207488 | 7/2002 |
| JP | 2003-44046 | 2/2003 |

OTHER PUBLICATIONS

International Search Report for PCT/JP07/055078.

*Primary Examiner* — Huy T Nguyen
(74) *Attorney, Agent, or Firm* — Young & Thompson

(57) ABSTRACT

An information reproducing apparatus is provided with: a video operating device to set a video reproduction effect; a music operating device to set a music reproduction effect; an adding device for adding the video reproduction effect to the video image in accordance with an operation of the video operating device, and for adding the music reproduction effect to the music in accordance with an operation of the music operating device; a change operating device for changing a condition of the music operating device between a condition to set the music reproduction effect and a condition. to set the music reproduction effect and to set the video reproduction effect in linkage of the operation of the music operating device; and a controlling device for controlling the adding device to add the video reproduction effect to the video image in accordance with the operation of the music operating device.

8 Claims, 4 Drawing Sheets

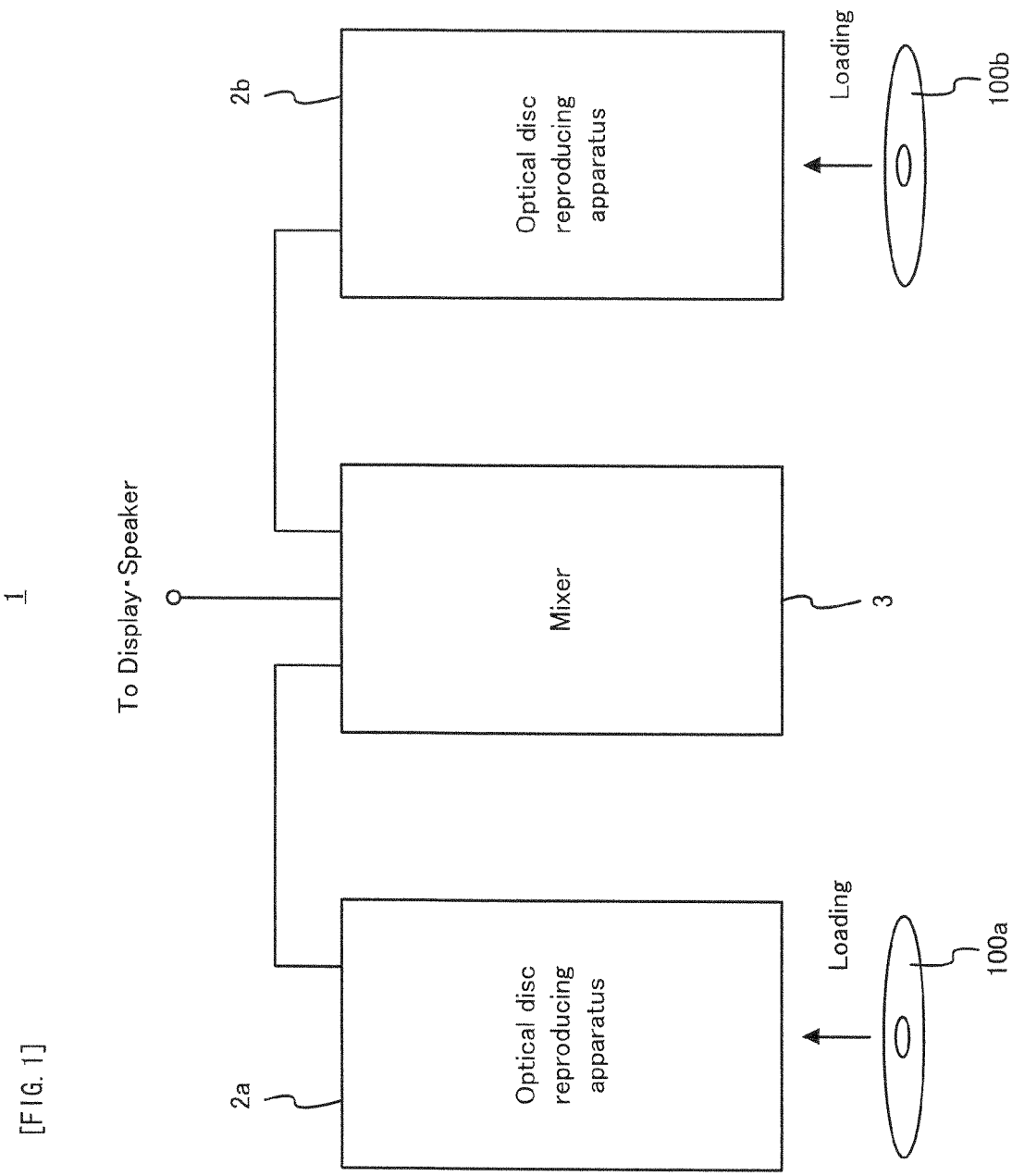

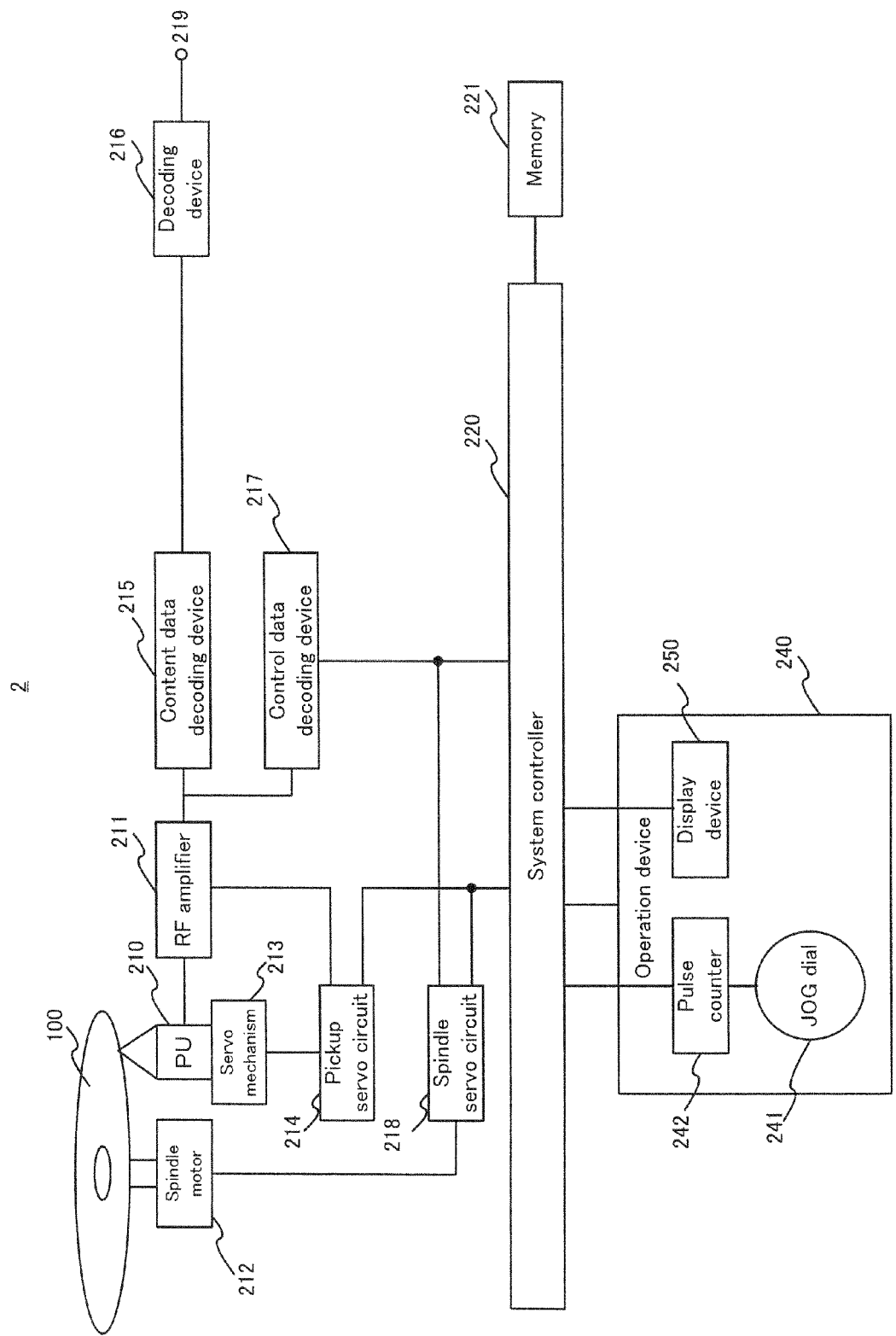
[FIG. 2]

[FIG. 3]
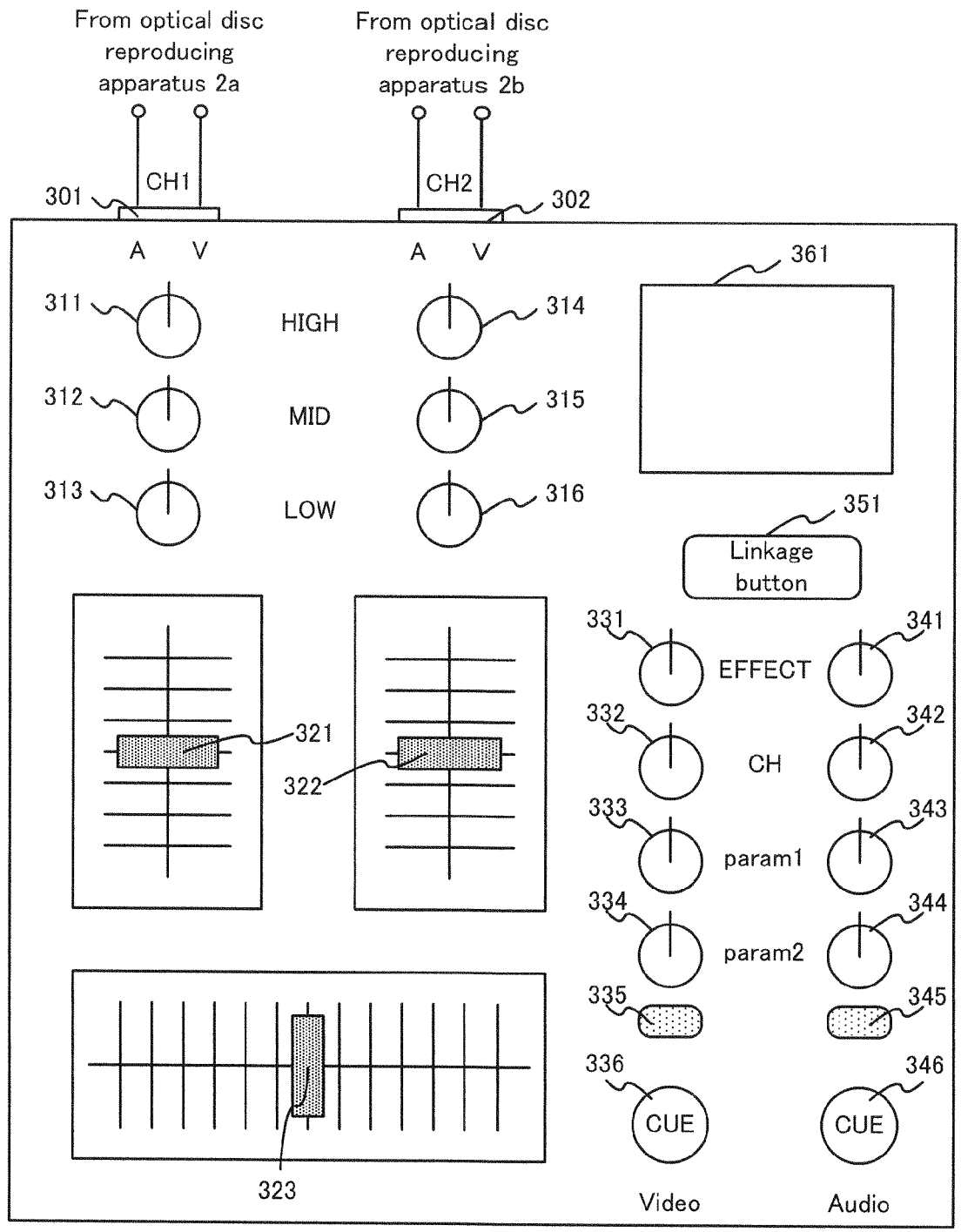

[FIG. 4]
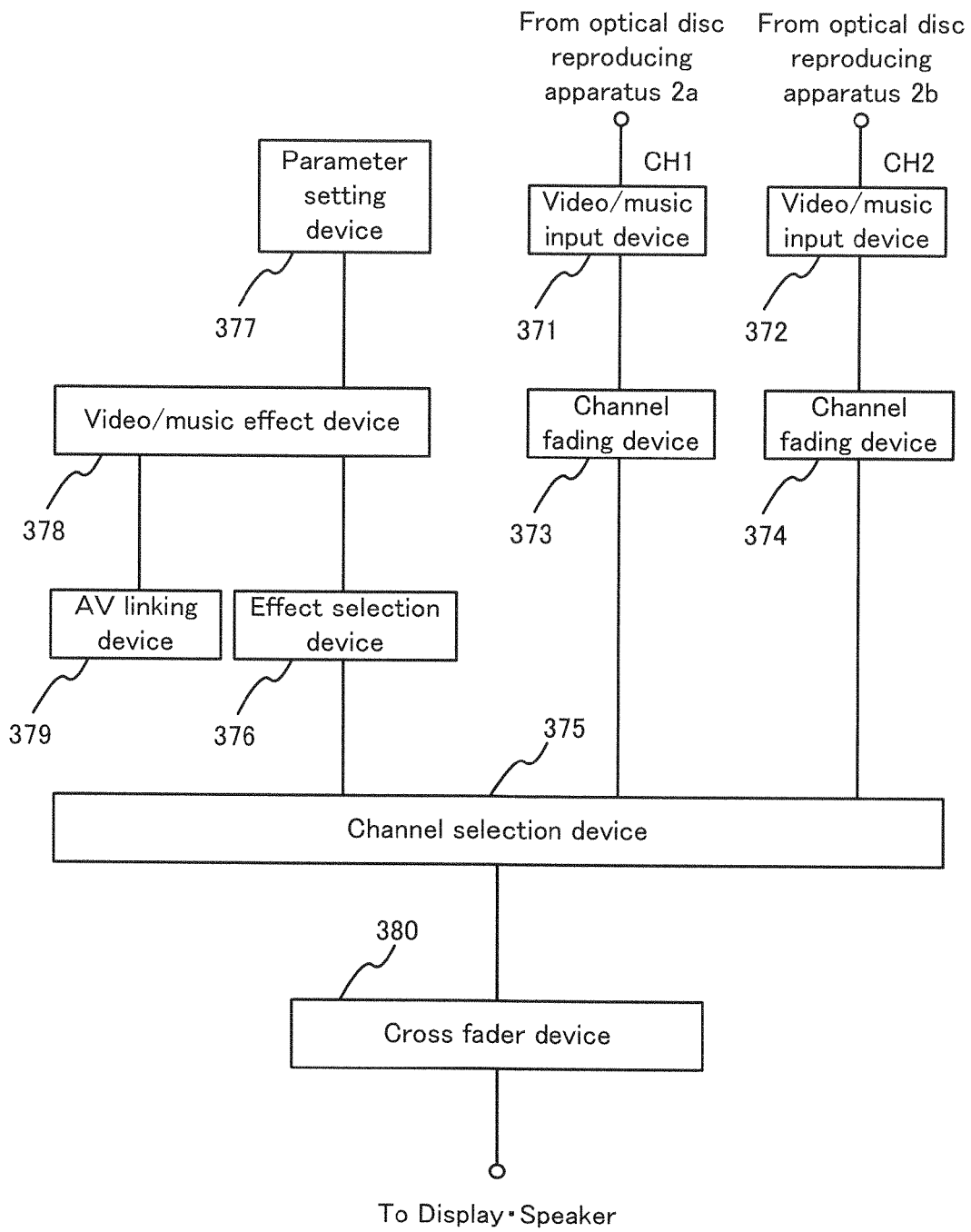

INFORMATION REPRODUCING APPARATUS AND METHOD, AND COMPUTER PROGRAM

TECHNICAL FIELD

The present invention relates to an information reproducing apparatus and method, such as a mixer or effecter, which is used by a DJ, and a computer program used for the information reproducing apparatus.

BACKGROUND ART

Recently, a recording medium, such as a CD and a DVD, which allows data recording and data reproduction by using a digital signal has been spread. Along with that, an information reproducing apparatus, which performs a unique reproduction process due to the digital signal, is also under development.

For example, in a CD and a DVD, a plurality of music pieces (i.e. content data) are recorded in association with each other. More specifically, for example, music pieces, each having a predetermined reproduction time length, are recorded as a plurality of data groups distinguished by track numbers. Thus, a DJ player can perform cue-reproduction which searches for a head address of each music piece and reproduces it, random-reproduction which arbitrarily changes the reproduction order of each music pieces, or the like. Moreover, it is also possible to change the volume of a piece of music to be reproduced, and to change its tempo. Recently, a DJ player which allows not only music but also video images to be reproduced in the same manner has appeared.

Moreover, by using a mixer, it is possible to mix music pieces or the like, which are reproduced from a plurality of DJ players. For example, it is assumed that when a piece of music reproduced by one DJ player comes from a speaker, another piece of music reproduced by another DJ player is mixed therewith. In this case, for example, by increasing the volume of the piece of music reproduced by the another DJ player while reducing the volume of the piece of music reproduced by the one DJ player, it is possible to continue the music reproduction, with the two different pieces of music smoothly connected.

Moreover, by using an effecter, it is possible to add various effects, to the music to be reproduced or the like. Depending on the effecter, it is possible to generate a delay sound, to generate an echo sound, to send a sound between right side and left side, to add the effect that a jet plane ascends or descends periodically, or to cut a sound periodically.

These are used to provide a user with more comfortable music or music with a sensation of reality. On the other hand, as a method of providing the comfortable music or the music with a sensation of reality, a method disclosed in a patent document 1 is listed
Patent document 1: Japanese Patent Application Laid Open NO. 2002-207488

DISCLOSURE OF INVENTION

Subject to be Solved by the Invention

However, in the above method, an operation button for giving a reproduction instruction or the like with respect to video images can only give the reproduction instruction or the like with respect to video images. In the same manner, an operation button for giving a reproduction instruction or the like with respect to music can only give the reproduction instruction or the like with respect to music. That is, there is such a technical problem that the reproduction instruction cannot be given with respect to both the video images and music, simply by using one operation button.

The subject to be solved by the present invention includes the aforementioned problem as one example. It is therefore an object of the present invention to provide an information reproducing apparatus and method, which allow reproduction while linking video images and music.

Means for Solving the Subject (Information Reproducing Apparatus)

The above object of the present invention can be achieved by an information reproducing apparatus provided with: a video operating device which is operated by a user to set a video reproduction effect for a video image; a music operating device which is operated by the user to set a music reproduction effect for music; an adding device for setting the video reproduction effect in accordance with an operation amount of the video operating device and adding the set video reproduction effect to the video image, and for setting the music reproduction effect in accordance with an operation amount of the music operating device and adding the set music reproduction effect to the music; a change operating device which is operated by the user to perform at least one of (i) a change operation of changing a condition of the video operating device between (i-i) a condition to be operated by the user in order to set the video reproduction effect for the video image and (i-ii) a condition to be operated by the user in order to set the video reproduction effect for the video image and to set the music reproduction effect in linkage with the operation of the video operating device, and (ii) a change operation of changing a condition of the music operating device between (ii-i) a condition to be operated by the user in order to set the music reproduction effect for the music and (ii-ii) a condition to be operated by the user in order to set the music reproduction effect for the music and to set the video reproduction effect in linkage of the operation of the music operating device; and a controlling device for controlling the adding device to perform at least one of (i) an operation of setting the music reproduction effect in to accordance with the operation amount of the video operating device and of adding the music reproduction effect to the music, and (ii) an operation of setting the video reproduction effect in accordance with the operation amount of the music operating device and of adding the video reproduction effect to the video image.

According to the information reproducing apparatus of the preset invention, it is provided with the video operating device and the music operating device. The video operating device is operated by the user of the information reproducing apparatus in order to set the video reproduction effect for the video image. The music operating device is operated by the user of the information reproducing apparatus in order to set the music reproduction effect for the music.

In accordance with the operation amount or the like of the video operating device, it is set by the operation of the adding device what type of video reproduction effect is added or what degree of video reproduction effect is added. Then, the set video reproduction effect is added to the video image. As a result, the video image with the video effect added is reproduced. In the same manner, the music operating device is operated by the user of the information reproducing apparatus in order to set the music reproduction effect for the music. In accordance with the operation amount or the like of the music operating device, it is set by the operation of the adding device what type of music reproduction effect is added or what degree of music reproduction effect is added. Then, the set music reproduction effect is added to the music. As a result, the music with the music effect added is reproduced.

In the present invention, in particular, the change operating device is provided. The change operating device is operated by the user to change the condition of the video operating device, as occasion demands, between the condition to be operated by the user in order to set the video reproduction effect for the video image and the condition to be operated by the user in order to set the video reproduction effect for the video image and to set the music reproduction effect in linkage with the operation of the video operating device. In addition to or instead of this, the change operating device is operated by the user to change the condition of the music operating device, as occasion demands, between the condition to be operated by the user in order to set the music reproduction effect for the music and the condition to be operated by the user in order to set the music reproduction effect for the music and to set the video reproduction effect in linkage of the operation of the music operating device.

If the change operating device is operated to thereby change the condition of the video operating device to the condition to be operated by the user in order to set the video reproduction effect for the video image and to set the music reproduction effect in linkage with the operation of the video operating device, the adding device is controlled by the operation of the controlling device to set each of the video reproduction effect and the music reproduction effect in accordance with the operation amount of the video operating device. On the other hand, if the change operating device is operated to thereby change the condition of the video operating device to the condition to be operated by the user in order to set the video reproduction effect for the video image, the adding device is controlled by the operation of the controlling device to set the video reproduction effect in accordance with the operation amount of the video operating device.

In the same manner, if the change operating device is operated to thereby change the condition of the music operating device to the condition to be operated by the user in order to set the music reproduction effect for the music and to set the video reproduction effect in linkage with the operation of the music operating device, the adding device is controlled by the operation of the controlling device to set each of the video reproduction effect and the music reproduction effect in accordance with the operation amount of the music operating device. On the other hand, if the change operating device is operated to thereby change the condition of the music operating device to the condition to be operated by the user in order to set the music reproduction effect for the music, the adding device is controlled by the operation of the controlling device to set the music reproduction effect in accordance with the operation amount of the music operating device.

As described above, according to the information reproducing apparatus of the present invention, it is possible to operate the video operating device, which is operated normally to set the video reproduction effect, in order to set the music reproduction effect in addition to the video reproduction effect. By this, if the user operates the video operating device, it is possible to add a predetermined reproduction effect to the music in linkage with the video image. That is, by operating the video reproducing device, the video image and music can be reproduced in linkage with each other.

In the same manner, it is possible to operate the music operating device, which is operated normally to set the music reproduction effect, in order to set the video reproduction effect in addition to the music reproduction effect. By this, if the user operates the music operating device, it is possible to add a predetermined reproduction effect to the video image in linkage with the music. That is, by operating the music reproducing device, the video image and music can be reproduced in linkage with each other.

Moreover, by virtue of the change operating device, the condition of the video operating device or the music operating device can be changed, as occasion demands. By this, while ensuring the basic function of operating the video operating device to set the video reproduction effect, it is possible to add an additional function of operating the video operating device to set the music reproduction effect, as occasion demands. In the same manner, while ensuring the basic function of operating the music operating device to set the music reproduction effect, it is possible to add an additional function of operating the music operating device to set the video reproduction effect, as occasion demands.

In one aspect of the information reproducing apparatus of the present invention, each of the video operating device and the music operating device includes a rotary volume which is rotated and operated by the user.

By virtue of such construction, the aforementioned various benefits can be received without impairing the operability of the rotary volume which is normally used to add an effect process on DJ equipment or the like, for example.

In another aspect of the information reproducing apparatus of the present invention, if the condition of the video operating device is changed from the condition to be operated by the user in order to set the video reproduction effect for the video image and to set the music reproduction effect in linkage with the operation of the video operating device, to the condition to be operated by the user in order to set the video reproduction effect for the video image, the adding device gradually reduces the music reproduction effect such that the music reproduction effect set for the music becomes zero.

According to this aspect, when the predetermined reproduction effect is added even to the music in linkage with the video image by operating the video operating device, the reproduction effect added to the music can be mildly canceled or released.

In another aspect of the information reproducing apparatus of the present invention, if the condition of the music operating device is changed from the condition to be operated by the user in order to set the music reproduction effect for the music and to set the video reproduction effect in linkage of the operation of the music operating device, to the condition to be operated by the user in order to set the music reproduction effect for the music, the adding device gradually reduces the video reproduction effect such that the video reproduction effect set for the video image becomes zero.

According to this aspect, when the predetermined reproduction effect is added even to the video image in linkage with the music by operating the music operating device, the reproduction effect added to the video image can be mildly canceled or released.

In another aspect of the information reproducing apparatus of the present invention, it is further provided with a displaying device for indicating that the condition of the video operating device is the condition to be operated by the user in order to set the video reproduction effect for the video image and to set the music reproduction effect in linkage with the operation of the video operating device.

According to this aspect, the user can recognize which condition the video operating device is in, relatively easily.

In another aspect of the information reproducing apparatus of the present invention, it is further provided with a displaying device for indicating that the condition of the music operating device is the condition to be operated by the user in order to set the music reproduction effect for the music and to set the video reproduction effect in linkage of the operation of the music operating device.

According to this aspect, the user can recognize which condition the music operating device is in, relatively easily.

(Information Reproducing Method)

The above object of the present invention can be also achieved by an information reproducing method in an information reproducing apparatus provided with: a video operating device which is operated by a user to set a video reproduction effect for a video image; a music operating device which is operated by the user to set a music reproduction effect for music; and a change operating device which is operated by the user to perform at least one of (i) a change operation of changing a condition of the video operating device between (i-i) a condition to be operated by the user in order to set the video reproduction effect for the video image and (i-ii) a condition to be operated by the user in order to set the video reproduction effect for the video image and to set the music reproduction effect in linkage with the operation of the video operating device, and (ii) a change operation of changing a condition of the music operating device between (ii-i) a condition to be operated by the user in order to set the music reproduction effect for the music and (ii-ii) a condition to be operated by the user in order to set the music reproduction effect for the music and to set the video reproduction effect in linkage of the operation of the music operating device, the information reproducing method provided with: an adding process of setting the video reproduction effect in accordance with an operation amount of the video operating device and adding the set video reproduction effect to the video image, and of setting the music reproduction effect in accordance with an operation amount of the music operating device and adding the set music reproduction effect to the music; a controlling process of controlling the adding process to perform at least one of (i) an operation of setting the music reproduction effect in accordance with the operation amount of the video operating device and of adding the music reproduction effect to the music, and (ii) an operation of setting the video reproduction effect in accordance with the operation amount of the music operating device and of adding the video reproduction effect to the video image.

According to the information reproducing method of the present invention, it is possible to receive the same benefits as those of the aforementioned information reproducing apparatus of the present invention.

Incidentally, in response to the aforementioned various aspects of the information reproducing apparatus of the present invention, the information reproducing method of the present invention can also employ various aspects.

(Computer Program)

The above object of the present invention can be also achieved by a computer program for reproduction control and for controlling a computer provided in an information reproducing apparatus provided with: a video operating device which is operated by a user to set a video reproduction effect for a video image; a music operating device which is operated by the user to set a music reproduction effect for music; an adding device for setting the video reproduction effect in accordance with an operation amount of the video operating device and adding the set video reproduction effect to the video image, and for setting the music reproduction effect in accordance with an operation amount of the music operating device and adding the set music reproduction effect to the music; a change operating device which is operated by the user to perform at least one of (i) a change operation of changing a condition of the video operating device between (i-i) a condition to be operated by the user in order to set the video reproduction effect for the video image and (i-ii) a condition to be operated by the user in order to set the video reproduction effect for the video image and to set the music reproduction effect in linkage with the operation of the video operating device, and (ii) a change operation of changing a condition of the music operating device between (ii-i) a condition to be operated by the user in order to set the music reproduction effect for the music and (ii-ii) a condition to be operated by the user in order to set the music reproduction effect for the music and to set the video reproduction effect in linkage of the operation of the music operating device; and a controlling device for controlling the adding device to perform at least one of (i) an operation of setting the music reproduction effect in accordance with the operation amount of the video operating device and of adding the music reproduction effect to the music, and (ii) an operation of setting the video reproduction effect in accordance with the operation amount of the music operating device and of adding the video reproduction effect to the video image, the computer program making the computer function as at least one portion of the adding device and the controlling device.

According to each of the computer program of the present invention, the aforementioned information reproducing apparatus of the present invention can be relatively easily realized as a computer reads and executes the computer program from a program storage device, such as a ROM, a CD-ROM, a DVD-ROM, and a hard disk, or as it executes the computer program after downloading the program through a communication device.

Incidentally, in response to the various aspects of the aforementioned information reproducing apparatus of the present invention, the computer program of the present invention can also employ various aspects.

The above object of the present invention can be also achieved by a computer program product in a computer-readable medium for tangibly embodying a program of instructions executable by a computer provided in the aforementioned information reproducing apparatus of the present invention (including its various aspects), the computer program product making the computer function as at least one portion of the information reproducing apparatus.

According to the computer program product of the present invention, the aforementioned information reproducing apparatus of the present invention can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as the aforementioned information reproducing apparatus of the present invention.

These effects and other advantages of the present invention will become more apparent from the embodiment explained below.

As explained above, according to the information reproducing apparatus of the present invention, it is provided with the video operating device, the music operating device, the adding device, the change operating device, and the controlling device. According to the information reproducing method of the present invention, it is provided with the adding process and the controlling device. According to the computer program of the present invention, it makes a computer function as the information reproducing apparatus of the present invention. Therefore, it is possible to reproduce the video image and music in linkage with each other.

BRIEF DESCRIPTION OF DRAWINGS

FIG. 1 is a block diagram conceptually showing the basic structure of a DJ reproduction system in an embodiment.

FIG. 2 is a block diagram conceptually showing the basic structure of an optical disc reproducing apparatus in the embodiment.

FIG. 3 is a plan view conceptually showing the external basic structure of a mixer in the embodiment.

FIG. 4 is a plan view conceptually showing the basic structure of an inner logical circuit of the mixer in the embodiment.

DESCRIPTION OF REFERENCE CODES

1 DJ reproduction system
2 optical disc reproducing apparatus
3 mixer
100 optical disc
331, 332, 333, 334, 341, 342, 343, 344 effect rotary volume
335, 345 indicator
336, 346 cue button
351 linkage button
375 channel selection device
376 effect selection device
377 parameter setting device
378 video/music effect device
379 AV linking device

BEST MODE FOR CARRYING OUT THE INVENTION

Hereinafter, the best mode for carrying out the present invention will be explained in each embodiment in order with reference to the drawings. Incidentally, in the embodiment below, the information reproducing apparatus of the present invention is applied to a DJ reproduction system, which combines an optical disc reproducing apparatus, such as a CD player or a DVD player, which has various reproduction functions represented by reproduction speed control, tempo control, fast-rewind reproduction, or the like, and a mixer for adding a video effect or music effect if necessary. Specifically, in the embodiment below, the information reproducing apparatus of the present invention is applied to the mixer. Moreover, the optical disc reproducing apparatus in the embodiment explained below is used as DJ equipment, which is used when music data or video data are continuously reproduced while various special effects (or effects) are added to the data at a dance place, such as a club and a disco. Incidentally, the "DJ" in the embodiment is a concept indicating that contents in a wide sense, which include not only music but also video images, are reproduced in special techniques.

Firstly, with reference to FIG. 1, the basic structure of a DJ reproduction system 1 in the embodiment will be explained. FIG. 1 is a block diagram conceptually showing the basic structure of the DJ reproduction system 1 in the embodiment.

As shown in FIG. 1, a DJ reproduction system 1 in the embodiment is provided with: a plurality of optical disc reproducing apparatuses 2 (specifically, 2a and 2b); and a mixer 3.

Each of the optical disc reproducing apparatuses 2a and 2b has a function of reproducing video data and music data recorded on optical discs 100a and 100b. The reproduced video images and music are outputted to the mixer 3. Incidentally, the detailed structure of the optical disc reproducing apparatuses 2 will be described later (refer to FIG. 2).

The mixer 3 constitutes one specific example of the "information reproducing apparatus" of the present invention, and has a function of combining the video data and the music data reproduced on the optical disc reproducing apparatuses 2a and 2b, into one video data and one music data (i.e. a mixing function). Moreover, the mixer 3 has a function of adding a predetermined video effect and a predetermined music effect, if necessary, to the video data and the music data reproduced on each of the optical disc reproducing apparatuses 2a and 2b. The video data and the music data after the video effect and the music effect are added, or the combined one video data and one music data, are outputted to external output equipment, such as a display and a speaker. By this, the video images and music are reproduced on the external output equipment.

Next, with reference to FIG. 2, the basic structure of the optical disc reproducing apparatus 2 will be explained. FIG. 2 is a block diagram conceptually showing the basic structure of the optical disc reproducing apparatus 2 in the embodiment.

As shown in FIG. 2, the optical disc reproducing apparatus 2 is provided with: an optical pickup (PU: Pick Up) 210; a RF (Radio Frequency) amplifier 211; a spindle motor 212; a servo mechanism 213; a pickup servo circuit 214; a content data decoding device 215; a decoding device 216; a control data decoding device 217; a spindle servo circuit 218; an external output terminal 260; a system controller 220; a memory 221; an operation device 240; and a display device 250.

The optical pickup 210 is to read content data including the video data and the music data, and control data from the optical disc 100, and it is formed of a semiconductor laser apparatus, various lenses, an actuator and the like. More specifically, the optical pickup 210 irradiates the optical disc 100 with a laser beam LB at a predetermined power. Moreover, the optical pickup 210 is provided with a PD (Photo Detector) sensor for receiving the reflective light of the laser beam LB from the optical disc 100, and it outputs the received reflective light as a reading signal to the RF amplifier 211.

The optical pickup 210 is adapted to be displaced in the radial direction or the like of the optical disc 100 in accordance with a tracking error signal, by a not-illustrated actuator, slider, or the like driven by the control of the servo mechanism 213. In addition, by the control of the servo mechanism 213, the optical pickup 210 is adapted to change the focal point of the laser beam LB and to perform focus control in accordance with a focus error signal.

The RF amplifier 211 generates a RF signal on the basis of the reading signal outputted from the optical pickup 210 and outputs the generated RF signal to each of the content data decoding device 215 and the control data decoding device 217. Moreover, the RF amplifier 211 generates an error signal, such as a focus error signal for controlling the focus when the optical pickup 210 irradiates the optical disc 100 with the laser beam LB and a tracking error signal for controlling the tracking when the optical pickup 210 irradiates the optical disc 100 with the laser beam LB, on the basis of the reading signal outputted from the optical pickup 210. The generated error signal is outputted to the pickup servo circuit 214.

The spindle motor 212 is adapted to rotate the optical disc 100 at a predetermined speed under the spindle servo by the spindle servo circuit 218.

The servo mechanism 213 displaces the optical pickup 210 in the radial direction of the optical disc 100, on the basis of a tracking servo control signal outputted from the pickup servo circuit 214. Moreover, on the basis of a focus servo control signal outputted from the pickup servo circuit 214, the servo mechanism 213 displaces an objective lens included in the optical pickup 210 along the optical axis of the laser beam LB.

The pickup servo circuit 214 generates the focus servo control signal and the tracking servo control signal for controlling the servo mechanism 213, on the basis of the error signal outputted from the RF amplifier 211. The focus servo control signal and the tracking servo control signal which are generated are outputted to the servo mechanism 213. In other words, in order to inhibit the generation of a focus error and a tracking error, the pickup servo circuit 214 feedback-controls the servo mechanism 213 on the basis of the error signal outputted from the RF amplifier 211.

The content data decoding device 215 decodes the RF signal outputted from the RF amplifier 211, to thereby generate a stream signal including a video stream and an audio stream. The generated stream signal is outputted to the decoding device 216.

The decoding device 216 decodes the stream signal and generates a reproduction signal. The generated reproduction signal is outputted to the mixer 3 through the external output terminal 260.

The control data decoding device 217 decodes the RF signal outputted from the RF amplifier 211, to thereby generate the control data for controlling the reproduction of the content data. As the control data, for example, TOC data or the like recorded in a lead-in area of the optical disc 100, synchronization data recorded with it included in the stream signal, sub-code data including time-passage information when the content data is reproduced, or the like are listed as one specific example. The generated control data is outputted to the system controller 220 and is used to control the reproduction of the content data.

The spindle servo circuit 218 detects an error of the synchronization data with respect to the rotational speed of the spindle motor 212 instructed from the system controller 220, and feedback-controls the rotation of the spindle motor 212 in order to inhibit the generation of the error.

The system controller 220 is provided with a microprocessor (MPU), and executes a system program (or firmware or the like) set in advance, to thereby provide central control for the operation of the entire optical disc reproducing apparatus 2.

The memory 221 is provided with a RAM area to temporarily store various data or the like necessary for the operation of the optical disc reproducing apparatus 2, or a ROM area to store the system program or the like for defying the operation of the system controller 220, or the like.

Moreover, the system controller 220 is connected to the operation device 240 and the display device 250. Instruction data from the various operation keys provided for the operation device 240 is outputted to the system controller 220, and the system controller 220 controls the reproduction of the content data in accordance with the instruction data. Moreover, the system controller 220 controls the display operation of the display device 250.

The operation device 240 is provided with: a jog dial 241; a pulse counter 242; and the display device 250.

The jog dial 241 is a disc-shaped operation key which can rotate in both directions. When the user or the like operates the jog dial 241 and changes the rotational direction and rotational speed of the jog dial 241 as occasion demands, forward-reproduction and reverse-reproduction can be set in accordance with the rotational direction, and moreover, the tone of the music reproduced by a speaker or a head phone can be changed in accordance with the rotational speed.

Incidentally, the aforementioned forward-reproduction means the reproduction of the content data on the optical disc 100 in recorded order, as in the case that the video images and music are reproduced while an analog record such as an LP is rotated in a forward direction. Therefore, the video images are reproduced in a direction along a reproduction time axis, or the music is reproduced as a normal sound in accordance with the clockwise rotation of the jog dial 241. Moreover, even while the jog dial 241 is stopped, the forward-reproduction can be performed.

On the other hand, the aforementioned reverse-reproduction means the reproduction of the content data on the optical disc 100 in reverse order opposite to the recorded order, as in the case that the video images and music are reproduced while the analog record is rotated in the reverse direction. That is, since the video images and music are continuously recorded (or analog-recorded) on the analog record, rotating the analog record in the reverse direction causes the video images and music to be reproduced in the reverse direction, resulting in a reproduced imitation sound, which is different from the original video images and music. If the jog dial 241 is rotated in a counterclockwise direction, the individual content data which is digital recorded on the optical disc 100 is reproduced in the reverse order. This causes the same imitation sound as in the case that the analog record is rotated and reproduced in the reverse direction.

As described above, because the same function for reverse-reproducing the analog record is provided, if the user or the like repeats the quick reciprocating rotation of the jog dial 241 in the clockwise direction and in the counterclockwise direction, the imitation sound referred to as a so-called scratch sound (i.e. imitation sound such as "squeak" and "bang") can be generated. Then, when a musical performer referred to as a disk jockey operates the jog dial 241 to generate the aforementioned scratch sound or the like, the disk jockey can perform editing for producing rap music or the like by using a CD and a DVD.

The pulse counter 242 counts the pulse width of a pulse (or the number of pulses or the like) which is generated by the operation of rotating the jog dial 241, to thereby detect the rotational speed (or angular velocity) of the jog dial 241. In addition, on the basis of the pulse generated by the operation of rotating the jog dial 241, the pulse counter 242 detects the rotational direction of the jog dial 241. The detected rotational direction and the detected rotational speed of the jog dial 241 are outputted to the system controller 220. This allows the system controller 220 to recognize an operation amount of the jog dial 241 operated by the user or the like and to perform an effect operation according to the operation amount.

The display device 250 displays various information associated with the reproduction of the video images and music included in the content data. The display device 250 is provided with a display panel, such as a liquid crystal display and a fluorescent tube, and displays the various information, under the control of the system controller 220. For example, the display device 250 displays a track number of the video image and music which are currently being reproduced, an elapsed time of the video image and music which are currently being reproduced (i.e. a current reproduction time), the total track number of the video images and music recorded on the optical disc 100 which are currently loaded in the optical disc reproducing apparatus 2, and the like. Moreover, the display device 250 wave-displays a beat density or the like of the music, along the reproduction time axis. Alternatively, it may wave-display signal intensity in each frequency band of the music which is currently reproduced.

Of course, the display content on the display device 250 explained here is merely one specific example, and it will be obvious that other various information or the like may be displayed.

Next, with reference to FIG. 3, the basic structure of the mixer 3 in the embodiment will be explained. FIG. 3 is a plan view conceptually showing the external basic structure of the mixer 3 in the embodiment.

As shown in FIG. 3, the mixer 3 is provided with: an input terminal 301; an input terminal 302; an equalizer rotary volume 311; an equalizer rotary volume 312; an equalizer rotary volume 313; an equalizer rotary volume 314; an equalizer rotary volume 315; an equalizer rotary volume 316; a slider fader 321; a slide fader 322; a cross fader 323; an effect rotary volume 331; an effect rotary volume 332; an effect rotary volume 333; an effect rotary volume 334; an indicator 335; a cue button 336; an effect rotary volume 341; an effect rotary volume 342; an effect rotary volume 343; an effect rotary volume 344; an indicator 345; a cue button 346; a linkage button 351; and a display device 361.

The input terminal 301 is a terminal for inputting the video images and music outputted from the optical disc reproducing apparatus 2a. Hereinafter, the video data and music data inputted to the mixer 3 through the input terminal 301 are referred to as CH1 (channel 1) video data and music data.

The input terminal 302 is a terminal for inputting the video images and music outputted from the optical disc reproducing apparatus 2b. Hereinafter, the video data and music data inputted to the mixer 3 through the input terminal 302 are referred to as CH2 (channel 2) video data and music data.

The equalizer rotary volume 311 is operated by a user to adjust a level of a high-frequency band of the CH1 music data. For example, if the equalizer rotary volume 311 is rotated clockwise (i.e. to the right), it is possible to increase the level of the high-frequency band of the CH1 music data. On the other hand, if the equalizer rotary volume 311 is rotated counterclockwise (i.e. to the left), it is possible to reduce the level of the high-frequency band of the CH1 music data.

The equalizer rotary volume 312 is operated by a user to adjust a level of a middle-frequency band of the CH1 music data. For example, if the equalizer rotary volume 312 is rotated clockwise (i.e. to the right), it is possible to increase the level of the middle-frequency band of the CH1 music data. On the other hand, if the equalizer rotary volume 312 is rotated counterclockwise (i.e. to the left), it is possible to reduce the level of the middle-frequency band of the CH1 music data.

The equalizer rotary volume 313 is operated by a user to adjust a level of a low-frequency band of the CH1 music data. For example, if the equalizer rotary volume 313 is rotated clockwise (i.e. to the right), it is possible to increase the level of the low-frequency band of the CH1 music data. On the other hand, if the equalizer rotary volume 313 is rotated counterclockwise (i.e. to the left), it is possible to reduce the level of the low-frequency band of the CH1 music data.

The equalizer rotary volume 314 is operated by a user to adjust a level of a high-frequency band of the CH2 music data. For example, if the equalizer rotary volume 314 is rotated clockwise (i.e. to the right), it is possible to increase the level of the high-frequency band of the CH2 music data. On the other hand, if the equalizer rotary volume 314 is rotated counterclockwise (i.e. to the left), it is possible to reduce the level of the high-frequency band of the CH2 music data.

The equalizer rotary volume 315 is operated by a user to adjust a level of a middle-frequency band of the CH2 music data. For example, if the equalizer rotary volume 315 is rotated clockwise (i.e. to the right), it is possible to increase the level of the middle-frequency band of the CH2 music data. On the other hand, if the equalizer rotary volume 315 is rotated counterclockwise (i.e. to the left), it is possible to reduce the level of the middle-frequency band of the CH2 music data.

The equalizer rotary volume 316 is operated by a user to adjust a level of a low-frequency band of the CH2 music data. For example, if the equalizer rotary volume 316 is rotated clockwise (i.e. to the right), it is possible to increase the level of the low-frequency band of the CH2 music data. On the other hand, if the equalizer rotary volume 316 is rotated counterclockwise (i.e. to the left), it is possible to reduce the level of the low-frequency band of the CH2 music data.

The slider fader 321 is operated by a user to adjust an output level (in other words, volume) of the CH1 music data. For example, if the slider fader 321 is displaced upward, it is possible to increase the output level of the CH1 music data. On the other hand, if the slider fader 321 is displaced downward, it is possible to reduce the output level of the CH1 music data.

Incidentally, the slider fader 321 may be operated by a user to adjust an output level (e.g. brightness or the like) of the CH1 video data.

The slider fader 322 is operated by a user to adjust an output level (in other words, volume) of the CH2 music data. For example, if the slider fader 322 is displaced upward, it is possible to increase the output level of the CH2 music data. On the other hand, if the slider fader 322 is displaced downward, it is possible to reduce the output level of the CH2 music data.

Incidentally, the slider fader 322 may be operated by a user to adjust an output level (e.g. brightness or the like) of the CH2 video data.

The cross fader 323 is operated by a user to adjust a ratio of combining the CH1 video data and the CH2 video data and a ratio of combining the CH1 music data and the CH2 music data. For example, when the cross fader 323 is displaced to the leftmost side, the CH1 video data and music data and the CH2 video data and music data are combined at a ratio of 100%: 0%. That is, only the CH1 video data and music data are outputted to the external output equipment connected to the mixer 3. After that, as the cross fader 323 is displaced from the left side to the right side, the ratio of the CH1 video data and music data reduces, and the ratio of the CH2 video data and music data increases. For example, when the cross fader 323 is displaced near the midpoint, the CH1 video data and music data and the CH2 video data and music data are combined at a ratio of 50%:50%. That is, the CH1 video data and music data and the CH2 video data and music data are combined in a proportion of 1:1, and then are outputted to the external output equipment connected to the mixer 3. Moreover, for example, when the cross fader 323 is displaced to the rightmost side, the CH1 video data and music data and the CH2 video data and music data are combined at a ratio of 0%:100%. That is, only the CH2 video data and music data are outputted to the external output equipment connected to the mixer 3.

The effect rotary volume 331 constitutes one specific example of the "video operating device" of the present invention. The effect rotary volume 331 is operated by a user to set the type of the video effect to be added to the video data. For example, a video effect for blinking the video images periodically, a video effect for waving the video images periodically, or the like is set. Of course, it will be obvious that other various video effects may be set.

The effect rotary volume 332 constitutes one specific example of the "video operating device" of the present invention. The effect rotary volume 332 is operated by a user to set the channel of the video data to which the video effect is added. In other words, the effect rotary volume 332 is operated by a user to select whether to add the video effect to the CH1 video data or the CH2 video data.

The effect rotary volume 333 constitutes one specific example of the "video operating device" of the present invention. The effect rotary volume 333 is operated by a user to set a first parameter indicating the extent of the video effect which is added to the video data (e.g. strength, periodicity, or the like of the video effect). For example, the first parameter may be set large by rotating the effect rotary volume 333 clockwise. On the other hand, the first parameter may be set small by rotating the effect rotary volume 333 counterclockwise.

The effect rotary volume 334 constitutes one specific example of the "video operating device" of the present invention. The effect rotary volume 334 is operated by a user to set a second parameter indicating the extent of the video effect which is added to the video data (e.g. strength, periodicity, or the like of the video effect). For example, the second parameter may be set large by rotating the effect rotary volume 334 clockwise. On the other hand, the second parameter may be set small by rotating the effect rotary volume 334 counterclockwise.

The indicator 335 constitutes one specific example of the "displaying device" of the present invention, and includes a LED, for example. The indicator 335 lights up if the effect rotary volume 331, the effect rotary volume 332, the effect rotary volume 333, the effect rotary volume 334, and the cue button 336 are in a condition to be operated in order to add the music effect to the music data in linkage with the addition of the video effect to the video data. On the other hand, the indicator 335 lights out if the effect rotary volume 331, the effect rotary volume 332, the effect rotary volume 333, the effect rotary volume 334, and the cue button 336 are in a condition to be operated in order to add the video effect only to the video data.

The cue button 336 is operated by a user to indicate the timing in which the video effect set by the effect rotary volume 331, the effect rotary volume 332, the effect rotary volume 333, and the effect rotary volume 334 is actually added to the video data. By that the cue button 336 is pressed, the video effect set by the effect rotary volume 331, the effect rotary volume 332, the effect rotary volume 333, and the effect rotary volume 334 is actually added to the video data, and the video image with the video effect added is displayed on a display.

The effect rotary volume 341 constitutes one specific example of the "music operating device" of the present invention. The effect rotary volume 341 is operated by a user to set the type of the music effect to be added to the music data. For example, a music effect causing a delay sound, a music effect causing an echo sound, a music effect causing an echo sound according to a pitch, or the like or set. Of course, it will be obvious that other various music effects may be set.

The effect rotary volume 342 constitutes one specific example of the "music operating device" of the present invention. The effect rotary volume 342 is operated by a user to set the channel of the music data to which the music effect is added. In other words, the effect rotary volume 342 is operated by a user to select whether to add the music effect to the CH1 music data or the CH2 music data.

The effect rotary volume 343 constitutes one specific example of the "music operating device" of the present invention. The effect rotary volume 343 is operated by a user to set a third parameter indicating the extent of the music effect which is added to the music data (e.g. strength, periodicity, or the like of the music effect). For example, the third parameter may be set large by rotating the effect rotary volume 343 clockwise. On the other hand, the third parameter may be set small by rotating the effect rotary volume 343 counterclockwise.

The effect rotary volume 344 constitutes one specific example of the "music operating device" of the present invention. The effect rotary volume 344 is operated by a user to set a fourth parameter indicating the extent of the music effect which is added to the music data (e.g. strength, periodicity, or the like of the music effect). For example, the fourth parameter may be set large by rotating the effect rotary volume 344 clockwise. On the other hand, the fourth parameter may be set small by rotating the effect rotary volume 344 counterclockwise.

The indicator 345 constitutes one specific example of the "displaying device" of the present invention, and includes a LED, for example. The indicator 345 lights up if the effect rotary volume 341, the effect rotary volume 342, the effect rotary volume 343, the effect rotary volume 344, and the cue button 346 are in a condition to be operated in order to add the video effect to the video data in linkage with the addition of the music effect to the music data. On the other hand, the indicator 345 lights out if the effect rotary volume 341, the effect rotary volume 342, the effect rotary volume 343, the effect rotary volume 344, and the cue button 346 are in a condition to be operated in order to add the music effect only to the music data.

The cue button 346 is operated by a user to indicate the timing in which the music effect set by the effect rotary volume 341, the effect rotary volume 342, the effect rotary volume 343, and the effect rotary volume 344 is actually added to the music data. By that the cue button 346 is pressed, the music effect set by the effect rotary volume 341, the effect rotary volume 342, the effect rotary volume 343, and the effect rotary volume 344 is actually added to the music data, and the music with the music effect added comes from a speaker.

The linkage button 351 constitutes one specific example of the "change operating device" of the present invention. The linkage button 351 is operated by a user to change the condition of the effect rotary volume 341, the effect rotary volume 342, the effect rotary volume 343, the effect rotary volume 344, and the cue button 346, to the condition to be operated in order to add the video effect to the video data in linkage with the addition of the music effect to the music data. For example, if the linkage button 351 is pressed when the effect rotary volume 341, the effect rotary volume 342, the effect rotary volume 343, the effect rotary volume 344, and the cue button 346 are in the condition to be operated in order to add the music effect only to the music data, the condition of the effect rotary volume 341, the effect rotary volume 342, the effect rotary volume 343, the effect rotary volume 344, and the cue button 346 is changed to the condition to be operated in order to add the video effect to the video data in linkage with the addition of the music effect to the music data. On the other hand, if the linkage button 351 is pressed when the effect rotary volume 341, the effect rotary volume 342, the effect rotary volume 343, the effect rotary volume 344, and the cue button 346 are in the condition to be operated in order to add the video effect to the video data in linkage with the addition of the music effect to the music data, the condition of the effect rotary volume 341, the effect rotary volume 342, the effect rotary volume 343, the effect rotary volume 344, and the cue button 346 is changed to the condition to be operated in order to add the music effect only to the music data.

The display device 361 is provided with a liquid crystal display or the like, for example, and displays an operation status of the mixer 3. For example, the display device 361 may be constructed to display information about the video data and the music data to be inputted to the mixer 3 (e.g. BPM, a play time, or the like), information about the video effect and the music effect to be added, or the like.

Next, with reference to FIG. 4, an explanation will be given on the basic structure of an inner logical circuit of the mixer 3 in the embodiment, and its operation aspect. FIG. 4 is a plan view conceptually showing the basic structure of the inner logical circuit of the mixer 3 in the embodiment.

As shown in FIG. 4, the video data and the music data inputted through the input terminal 301 from the optical disc reproducing apparatus 2a are inputted to a video/music input device 371 and then outputted to a channel fading device 373. In the same manner, the video data and the music data inputted through the input terminal 302 from the optical disc reproducing apparatus 2b are inputted to a video/music input device 372 and then outputted to a channel fading device 374.

The channel fading device 373 adjusts the output level of the CH1 video data and music data, in accordance with an operation amount of the slide fader 321. The CH1 video data and music data with the output level adjusted are outputted to a channel selection device 375.

The channel fading device 374 adjusts the output level of the CH2 video data and music data, in accordance with an operation amount of the slide fader 322. The CH2 video data and music data with the output level adjusted are outputted to the channel selection device 375.

The channel selection device 375 constitutes one specific example of the "adding device" of the present invention. The channel selection device 375 specifies the channel of the video data to which the video effect is to be added, in accordance with the operation of the effect rotary volume 332, and outputs the video data on the specified channel, to an effect selection device 376. For example, if it is selected by the effect rotary volume 332 to add the video effect to the CH1 video data, the channel selection device 375 outputs the CH1 video data outputted from the channel fading device 373, to the effect selection device 376. On the other hand, if it is selected by the effect rotary volume 332 to add the video effect to the CH2 video data, the channel selection device 375 outputs the CH2 video data outputted from the channel fading device 374, to the effect selection device 376.

In the same manner, the channel selection device 375 specifies the channel of the music data to which the music effect is to be added, in accordance with the operation of the effect rotary volume 342, and outputs the music data on the specified channel, to the effect selection device 376. For example, if it is selected by the effect rotary volume 342 to add the music effect to the CH1 music data, the channel selection device 375 outputs the CH1 music data outputted from the channel fading device 373, to the effect selection device 376. On the other hand, if it is selected by the effect rotary volume 342 to add the music effect to the CH2 music data, the channel selection device 375 outputs the CH2 music data outputted from the channel fading device 374, to the effect selection device 376.

The effect selection device 376 constitutes one specific example of the "adding device" of the present invention. The effect selection device 376 outputs the video data and the music data outputted from the channel selection device 375, to a video/audio effect device 378. At the same time, the effect selection device 376 sets the video effect to be added, in accordance with the operation of the effect rotary volume 331. Moreover, the effect selection device 376 sets the music effect to be added, in accordance with the operation of the effect rotary volume 341.

A parameter setting device 377 constitutes one specific example of the "adding device" of the present invention. The parameter setting device 377 sets the first parameter and the second parameter of the video effect to be added to the video data, in accordance with the operation of the effect rotary volumes 333 and 334. The set first parameter and the set second parameter are outputted to the video/music effect device 378.

In the same manner, the parameter setting device 377 sets the third parameter and the fourth parameter of the music effect to be added to the music data, in accordance with the operation of the effect rotary volumes 343 and 344. The set third parameter and the set fourth parameter are outputted to the video/music effect device 378.

The video/music effect device 378 constitutes one specific example of the "adding device" of the present invention. The video/music effect device 378 adds the video effect set by the effect selection device 376, to the video data in an aspect according to the first parameter and the second parameter set by the parameter setting device 377. In the same manner, the video/music effect device 378 adds the music effect set by the effect selection device 376, to the music data in an aspect according to the third parameter and the fourth parameter set by the parameter setting device 377. The video data with the video effect added and the music data with the music effect added are outputted to a cross fader device 380.

Incidentally, the timing in which the video effect is actually added to the video data is the timing in which the cue button 336 is pressed. In the same manner, the timing in which the music effect is actually added to the music data is the timing in which the cue button 346 is pressed.

The cross fader device 380 combines the CH1 video data and music data with the CH2 video data and music data, at a combination ratio according to the operation of the cross fader 323, into one video data and one music data. The combined one video data and one music data are outputted to the external output equipment, such as a display and a speaker, and outputted as video images and music.

The above explanation is given on the operation of the mixer 3 when the linkage button 351 is not pressed (or the linkage button 351 is OFF). That is, it is the explanation given on the operation of the mixer 3 when the condition of the effect rotary volume 341, the effect rotary volume 342, the effect rotary volume 343, the effect rotary volume 344, and the cue button 346 is in the condition to be operated in order to add the effect only to the music data.

In this case, the video effect is added in accordance with the operation of the effect rotary volume 331, the effect rotary volume 332, the effect rotary volume 333, the effect rotary volume 334, and the cue button 336. The music effect is added in accordance with the operation of the effect rotary volume 341, the effect rotary volume 342, the effect rotary volume 343, the effect rotary volume 344, and the cue button 346.

Next, an explanation will be given on the operation of the mixer 3 when the linkage button 351 is pressed (or the linkage button 351 is ON). Incidentally, the detailed explanation will be omitted on the common operation to that of the mixer 3 when the linkage button 351 is not pressed, described above.

An AV linking device 379 constitutes one specific example of the "controlling device" of the present invention. If the linkage button 351 is pressed, the condition of the effect rotary volume 341, the effect rotary volume 342, the effect rotary volume 343, the effect rotary volume 344, and the cue button 346, is changed to the condition to be operated in order to add the video effect to the video data in linkage with the addition of the music effect to the music data. At this time, the indicator 345 lights up. On the other hand, if the linkage button 351 is not pressed, the condition of the effect rotary volume 341, the effect rotary volume 342, the effect rotary volume 343, the effect rotary volume 344, and the cue button 346, is changed to the condition to be operated in order to add the music effect only to the music data. At this time, the indicator 345 lights out.

Specifically, the AV linking device 379 controls the channel selection device 375 to specify the channel of the music data to which the music effect is to be added, in accordance with the operation of the effect rotary volume 342, and to output the music data on the specified channel and the video data on the specified channel, to the effect selection device 376.

Moreover, the AV linking device 379 controls the effect selection device 376 to add the music effect to the music data, in accordance with the operation of the effect rotary volume 341, and to set the video effect to be added to the video data, in linkage with the set music effect.

Here, the effect selection device 376 set the video effect which is added in linkage with the music effect, set in accordance with the operation of the effect rotary volume 341 and thereby can realize more effective reproduction of the video images and music. In other words, the effect selection device 376 sets the video effect in accordance with the operation of the effect rotary volume 341.

Incidentally, the video effect which is added in linkage with the music effect and thereby can realize more effective reproduction of the video images often varies depending on the type of the music effect. For example, in most cases, the video effect which is added in linkage with the music effect and thereby can realize more effective reproduction of the video images in the case where the music effect causing a delay sound is set is different from that in the case where the music effect causing an echo sound is set. Thus, the mixer 3 preferably stores a table or the like which indicates an association between the music effect and the video effect to be added in linkage with the music effect, in advance in a memory or the like.

Moreover, the association between the music effect and the video effect to be added in linkage with the music effect is preferably prepared by repeating such a validation that the music with the music effect added and the video images with the video effect added are actually reproduced.

Moreover, the AV linking device 379 controls the parameter setting device 377 to set the third parameter and the fourth parameter in accordance with the operation of the effect rotary volume 343 and the effect rotary volume 344 and to set the first parameter and the second parameter in linkage with the third parameter and the fourth parameter set.

At this time, the parameter setting device 377 sets the first parameter and the second parameter in accordance with the operation of the effect rotary volume 343 and the effect rotary volume 344, regardless of the operation of the effect rotary volume 333 and the effect rotary volume 334.

Then, if the linkage button 351 is pressed, the video/music effect device 378 adds the music effect set by the effect selection device 376, to the music data, in an aspect according to the third parameter and the fourth parameter set by the parameter setting device 377. At the same time, the video/music effect device 378 adds the video effect set in linkage with the music effect set by the effect selection device 376, to the video data, in an aspect according to the first parameter and the second parameter set in linkage with the third parameter and the fourth parameter set by the parameter setting device 377.

As described above, if the linkage button 351 is pressed, a user can add the music effect to the music data and add the video effect to the video data in linkage with the music effect, using the effect rotary volume 341, the effect rotary volume 342, the effect rotary volume 343, the effect rotary volume 344, and the cue button 346. That is, the video effect can be added to the video data, without using the effect rotary volume 331, the effect rotary volume 332, the effect rotary volume 333, the effect rotary volume 334, and the cue button 336. In other words, if any one of the effect rotary volumes which are normally divided into one for video image and one for music is operated, it is possible to realize the linkage reproduction of the video images and music.

On the other hand, if the linkage button 351 is not pressed, a user adds the music effect to the music data, using the effect rotary volume 341, the effect rotary volume 342, the effect rotary volume 343, the effect rotary volume 344, and the cue button 346. In the same manner, a user adds the video effect to the video data, using the effect rotary volume 331, the effect rotary volume 332, the effect rotary volume 333, the effect rotary volume 334, and the cue button 336. That is, by using effect rotary volumes which are normally divided into one for video image and one for music, it is possible to add the video effect to the video data itself, and independently of this, it is also possible to add the music effect to the music data itself.

By this, it is possible to expand the range of the operation performed by a user on the video images and music, and it is also possible to operate the mixer 3 in the normally operated aspect. Therefore, there are such advantages that it is possible to reproduce the video images and music in linkage with each other in a more effective aspect or in an aspect appealing to an audience, and that the operability of the mixer 3 is not significantly changed. One main factor in the advantage that the operability of the mixer 3 is not significantly changed is that the aforementioned structure is adopted to the rotary volumes.

Incidentally, if the music effect and the video effect linked with the music effect are added using the effect rotary volume 341, the effect rotary volume 342, the effect rotary volume 343, the effect rotary volume 344, and the cue button 346, different factors may be assigned to the effect rotary volume 331, the effect rotary volume 332, the effect rotary volume 333, the effect rotary volume 334, and the cue button 336 which are not used for the linkage reproduction of the video images and music. For example, a function of adjusting the output level of the music data may be provided for the effect rotary volume 331, and a function of adjusting the output level of the video data may be provided for the effect rotary volume 332. Alternatively, even if the music effect and the video effect linked with the music effect are added using the effect rotary volume 341, the effect rotary volume 342, the effect rotary volume 343, the effect rotary volume 344, and the cue button 346, the video effect may be further added to the video data, collaterally, by using the effect rotary volume 331, the effect rotary volume 332, the effect rotary volume 333, the effect rotary volume 334, and the cue button 336.

Incidentally, the aforementioned embodiment adopts such construction that the music effect and the video effect linked with the music effect are added by using the effect rotary volume 341, the effect rotary volume 342, the effect rotary volume 343, the effect rotary volume 344, and the cue button 346, if the linkage button 351 is pressed. However, in addition to or instead of the construction, such construction may be adopted that the video effect and the music effect linked with the video effect are added using the effect rotary volume 331, the effect rotary volume 332, the effect rotary volume 333, the effect rotary volume 334, and the cue button 336, if the linkage button 351 is pressed.

In this case, two linkage buttons 351 may be provided. For example, by pressing the first linkage button 351, the condition of the effect rotary volume 331, the effect rotary volume 332, the effect rotary volume 333, the effect rotary volume 334, and the cue button 336 may be changed to the condition to be operated in order to add the video effect to the video data and add the music effect to the music data in linkage with the video data. For example, by pressing the second linkage button 351, the condition of the effect rotary volume 341, the effect rotary volume 342, the effect rotary volume 343, the effect rotary volume 344, and the cue button 346 may be changed to the condition to be operated in order to add the music effect to the music data and add the video effect to the video data in linkage with the music data.

Alternatively, a single linkage button 351 may be provided. In this case, every time the linkage button 351 is pressed, (i) the condition of the effect rotary volume 331, the effect rotary volume 332, the effect rotary volume 333, the effect rotary volume 334, and the cue button 336 may be changed to the condition to be operated in order to add the video effect to the video data and add the music effect to the music data in linkage with the video data, (ii) the condition of the condition of the effect rotary volume 341, the effect rotary volume 342, the effect rotary volume 343, the effect rotary volume 344, and the cue button 346 may be changed to the condition to be operated in order to add the music effect to the music data and add the video effect to the video data in linkage with the music data, (iii) the condition of the effect rotary volume 331, the effect rotary volume 332, the effect rotary volume 333, the effect rotary volume 334, and the cue button 336 may be changed to the condition to be operated in order to add the video effect only to the video data, and the condition of the effect rotary volume 341, the effect rotary volume 342, the effect rotary volume 343, the effect rotary volume 344, and the cue button 346 may be changed to the condition to be operated in order to add the music effect only to the music, data.

The present invention is not limited to the aforementioned embodiment, but various changes may be made, if desired, without departing from the essence or spirit of the invention which can be read from the claims and the entire specification. An information reproducing apparatus and method, and a computer program, all of which involve such changes, are also intended to be within the technical scope of the present invention.

INDUSTRIAL APPLICABILITY

The information reproducing apparatus and method, and the computer program according to the present invention can be applied to an information reproducing apparatus, such as a mixer or an effecter, which is used by a DJ. Moreover, they can be applied to an information reproducing apparatus or the like which is mounted on various computer equipment for consumer use or for commercial use, or which can be connected to various computer equipment.

The invention claimed is:

1. An information reproducing apparatus comprising:
    a video operating device which is operated by a user to set a video reproduction effect for a video image;
    a music operating device which is operated by the user to set a music reproduction effect for music;
    an adding device for setting the video reproduction effect in accordance with an operation amount of said video operating device and adding the set video reproduction effect to the video image, and for setting the music reproduction effect in accordance with an operation amount of said music operating device and adding the set music reproduction effect to the music;
    a change operating device which is operated by the user to perform at least one of (i) a change operation of changing a condition of said video operating device between (i-i) a condition to be operated by the user in order to set the video reproduction effect for the video image and (i-ii) a condition to be operated by the user in order to set the video reproduction effect for the video image and to set the music reproduction effect in linkage with the operation of said video operating device, and (ii) a change operation of changing a condition of said music operating device between (ii-i) a condition to be operated by the user in order to set the music reproduction effect for the music and (ii-ii) a condition to be operated by the user in order to set the music reproduction effect for the music and to set the video reproduction effect in linkage of the operation of said music operating device; and
    a controlling device for controlling said adding device to perform at least one of (i) an operation of setting the music reproduction effect in accordance with the operation amount of said video operating device and of adding the music reproduction effect to the music, and (ii) an operation of setting the video reproduction effect in accordance with the operation amount of said music operating device and of adding the video reproduction effect to the video image.

2. The information reproducing apparatus according to claim 1, wherein each of said video operating device and said music operating device includes a rotary volume which is rotated and operated by the user.

3. The information reproducing apparatus according to claim 1, wherein if the condition of said video operating device is changed from the condition to be operated by the user in order to set the video reproduction effect for the video image and to set the music reproduction effect in linkage with the operation of said video operating device, to the condition to be operated by the user in order to set the video reproduction effect for the video image, said adding device gradually reduces the music reproduction effect such that the music reproduction effect set for the music becomes zero.

4. The information reproducing apparatus according to claim 1, wherein if the condition of said music operating device is changed from the condition to be operated by the user in order to set the music reproduction effect for the music and to set the video reproduction effect in linkage of the operation of said music operating device, to the condition to be operated by the user in order to set the music reproduction effect for the music, said adding device gradually reduces the video reproduction effect such that the video reproduction effect set for the video image becomes zero.

5. The information reproducing apparatus according to claim 1, further comprising a displaying device for indicating that the condition of said video operating device is the condition to be operated by the user in order to set the video reproduction effect for the video image and to set the music reproduction effect in linkage with the operation of said video operating device.

6. The information reproducing apparatus according to claim 1, further comprising a displaying device for indicating that the condition of said music operating device is the condition to be operated by the user in order to set the music reproduction effect for the music and to set the video reproduction effect in linkage of the operation of said music operating device.

7. An information reproducing method in an information reproducing apparatus comprising:
 a video operating device which is operated by a user to set a video reproduction effect for a video image;
 a music operating device which is operated by the user to set a music reproduction effect for music; and
 a change operating device which is operated by the user to perform at least one of (i) a change operation of changing a condition of said video operating device between (i-i) a condition to be operated by the user in order to set the video reproduction effect for the video image and (i-ii) a condition to be operated by the user in order to set the video reproduction effect for the video image and to set the music reproduction effect in linkage with the operation of said video operating device, and (ii) a change operation of changing a condition of said music operating device between (ii-i) a condition to be operated by the user in order to set the music reproduction effect for the music and (ii-ii) a condition to be operated by the user in order to set the music reproduction effect for the music and to set the video reproduction effect in linkage of the operation of said music operating device, said information reproducing method comprising:
 an adding process of setting the video reproduction effect in accordance with an operation amount of said video operating device and adding the set video reproduction effect to the video image, and of setting the music reproduction effect in accordance with an operation amount of said music operating device and adding the set music reproduction effect to the music;
 a controlling process of controlling said adding process to perform at least one of (i) an operation of setting the music reproduction effect in accordance with the operation amount of said video operating device and of adding the music reproduction effect to the music, and (ii) an operation of setting the video reproduction effect in accordance with the operation amount of said music operating device and of adding the video reproduction effect to the video image.

8. A computer program product in a non-transitory computer readable medium for tangibly embodying a program of instructions executable by a computer provided in an information reproducing apparatus comprising:
 a video operating device which is operated by a user to set a video reproduction effect for a video image;
 a music operating device which is operated by the user to set a music reproduction effect for music;
 an adding device for setting the video reproduction effect in accordance with an operation amount of said video operating device and adding the set video reproduction effect to the video image, and for setting the music reproduction effect in accordance with an operation amount of said music operating device and adding the set music reproduction effect to the music;
 a change operating device which is operated by the user to perform at least one of (i) a change operation of changing a condition of said video operating device between (i-i) a condition to he operated by the user in order to set the video reproduction effect for the video image and (i-ii) a condition to be operated by the user in order to set the video reproduction effect for the video image and to set the music reproduction effect in linkage with the operation of said video operating device, and (ii) a change operation of changing a condition of said music operating device between (ii-i) a condition to be operated by the user in order to set the music reproduction effect for the music and (ii-ii) a condition to be operated by the user in order to set the music reproduction effect for the music and to set the video reproduction effect in linkage of the operation of said music operating device; and
 a controlling device for controlling said adding device to perform at least one of (i) an operation of setting the music reproduction effect in accordance with the operation amount of said video operating device and of adding the music reproduction effect to the music, and (ii) an operation of setting the video reproduction effect in accordance with the operation amount of said music operating device and of adding the video reproduction effect to the video image,
 said computer program making the computer function as at least one portion of said adding device and said controlling device.

* * * * *